United States Patent [19]
Airoldi et al.

[11] Patent Number: 5,216,506
[45] Date of Patent: Jun. 1, 1993

[54] PROGRAMMABLE DEVICE FOR STORING DIGITAL VIDEO LINES

[75] Inventors: Fabrizio Airoldi, Novara; Franco Cavallotti, Turin; Alessandro Cremonesi; Gian G. Rizzotto, both of Milan, all of Italy

[73] Assignee: SGS Thomson Microelectronics S.R.L., Milan, Italy

[21] Appl. No.: 725,016

[22] Filed: Jul. 3, 1991

[30] Foreign Application Priority Data

Jul. 17, 1990 [EP] European Pat. Off. ......... 90830334.0

[51] Int. Cl.$^5$ ........................ H04N 5/14; H04N 9/64
[52] U.S. Cl. ................................. 358/160; 358/21 R; 358/13
[58] Field of Search ................... 358/160, 21 R, 13 C; 340/799; 365/240, 189.12

[56] References Cited

U.S. PATENT DOCUMENTS 4,500,908 2/1985 Mandeberg ...................... 358/13 C
4,920,407 4/1990 Stoddard .......................... 358/21 R Primary Examiner—Victor R. Kostak
Assistant Examiner—Sherrie Hsia
Attorney, Agent, or Firm—Rosen, Dainow & Jacobs

[57] ABSTRACT

A programmable device for storing digital video lines, being of a type intended for use in TV sets with digital frame scan features whereby a video line is sample coded in a digital signal, comprises at least one pair of memories each adapted to contain the code of one video line, and a bank of registers connected in series to one another and to each of the memories, at least one of the registers being fed, at its input terminals, with the digital signal to parallel the samples to be input to the memories.

5 Claims, 7 Drawing Sheets

PROGRAMMABLE DEVICE FOR STORING DIGITAL VIDEO LINES

FIELD OF THE INVENTION

This invention relates to a programmable device for storing digital video lines, being of a type intended for use in digital frame scan TV sets wherein a video line is sample encoded in a digital signal.

BACKGROUND OF THE INVENTION

It is a well-known fact that digital frame scan TV sets are gaining increasing acceptance both on account of the high quality of their video frame and of the ability afforded by them to produce so-called special effects (e.g., sub-framing, zooming, etc.).

However, the spreading of such sets is still hampered by their comparatively high cost.

This cost is justified since they incorporate electronic devices of high circuit complexity interlinked into a system construction which is equally complicated.

A current trend in the art is toward less complex approaches to many of such set functions.

As an example, one of the most critical problems from the implementation standpoint is the need for storing parts of the video frame which are encoded in digital form, in particular one or more video lines, if not a whole half-raster.

In addition, there would also be a demand for handling the store stage of such cases using procedures (e.g., FIFOs, LIFOs, etc.) which depend on the type of application sought by the consumer.

No device is available as yet no the market which can store multiple video lines and at the same time handle the storing stage in an effective manner.

SUMMARY OF THE INVENTION

The technical problem that underlies this invention is to provide a device for storing digital video lines, which has the structural feature of reduced circuit complexity and the functional feature of enabling the video line storing to be programmed in a manner selected by the user.

BRIEF DESCRIPTION OF THE DRAWINGS

The features and advantages of a device according to the invention will be apparent form the following detailed description of an embodiment thereof, given by way of illustration and not of limitation with reference to the views of the accompanying drawings, wherein.

DISCLOSURE OF THE PREFERRED EMBODIMENTS OF THE INVENTION

Figure 1:
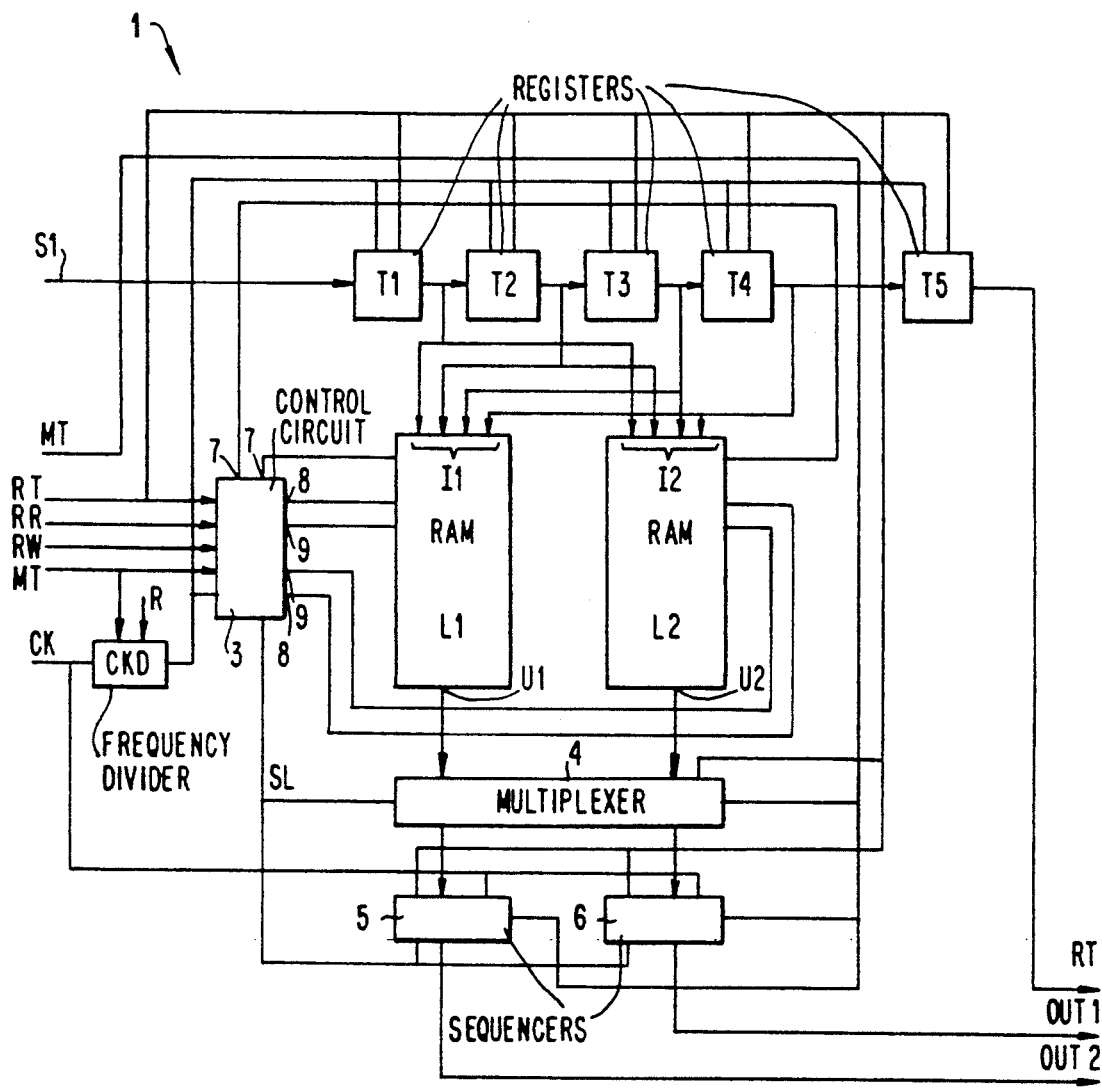
FIG. 1 is a diagramatic representation of the circuit construction of the device according to the invention.
Figure 2:
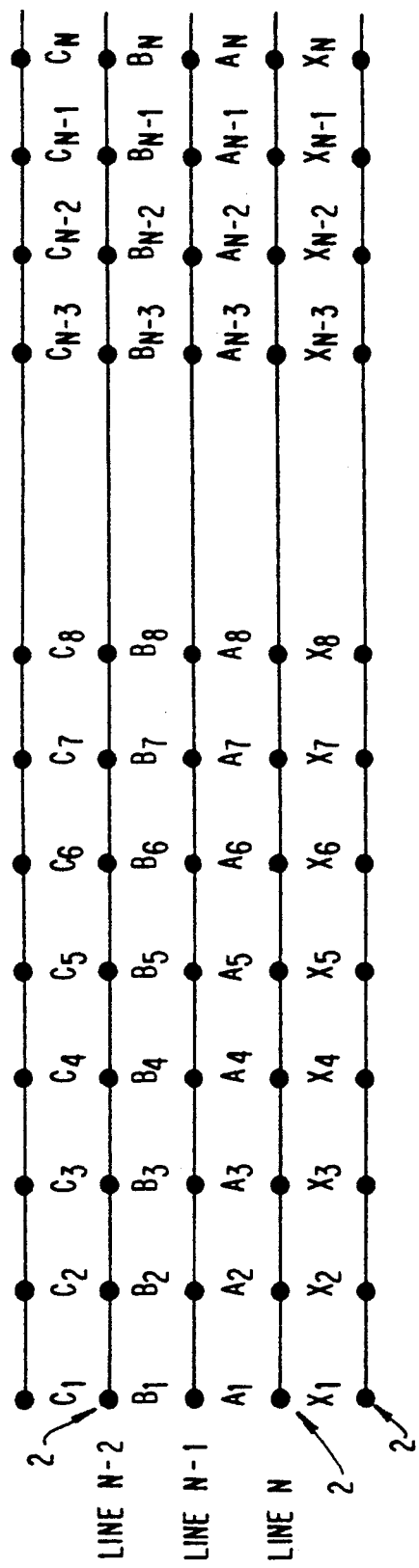
FIGS. 2 to 6 are respective waveform diagrams of digital signals having the same time base and being present in the device of FIG. 1.
Figure 3:
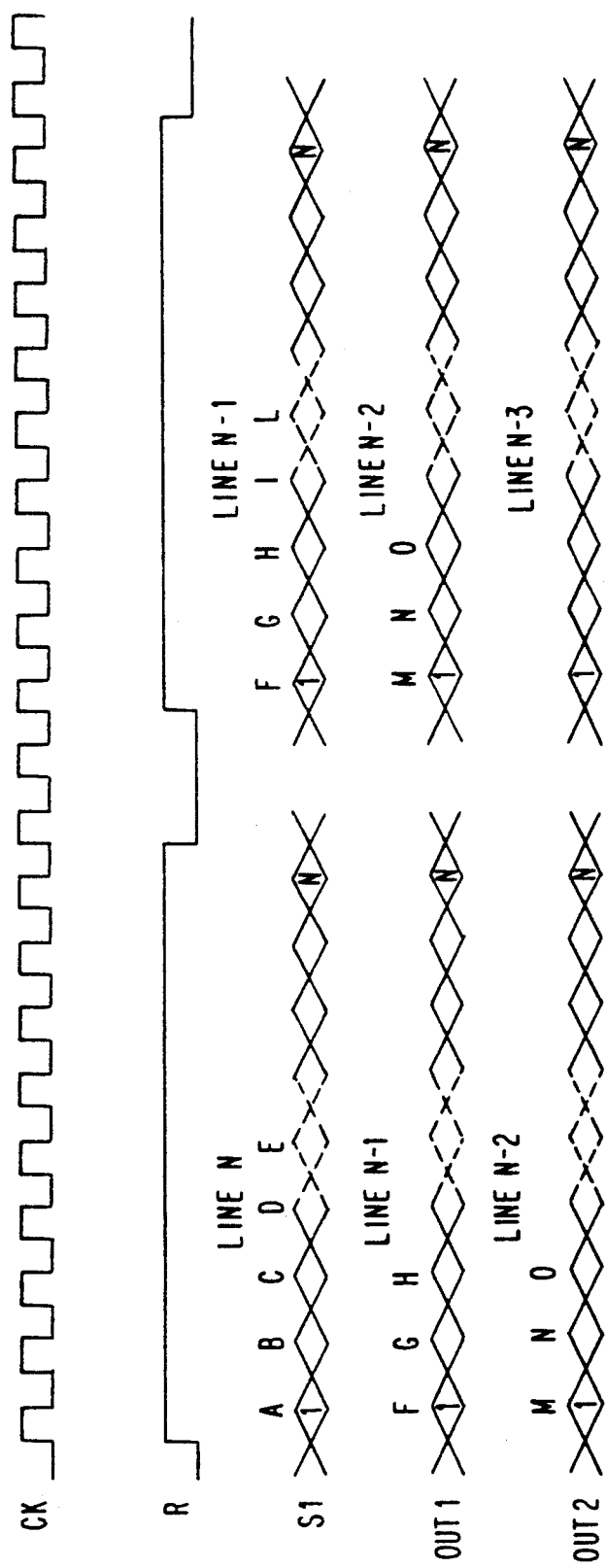
Figure 4:
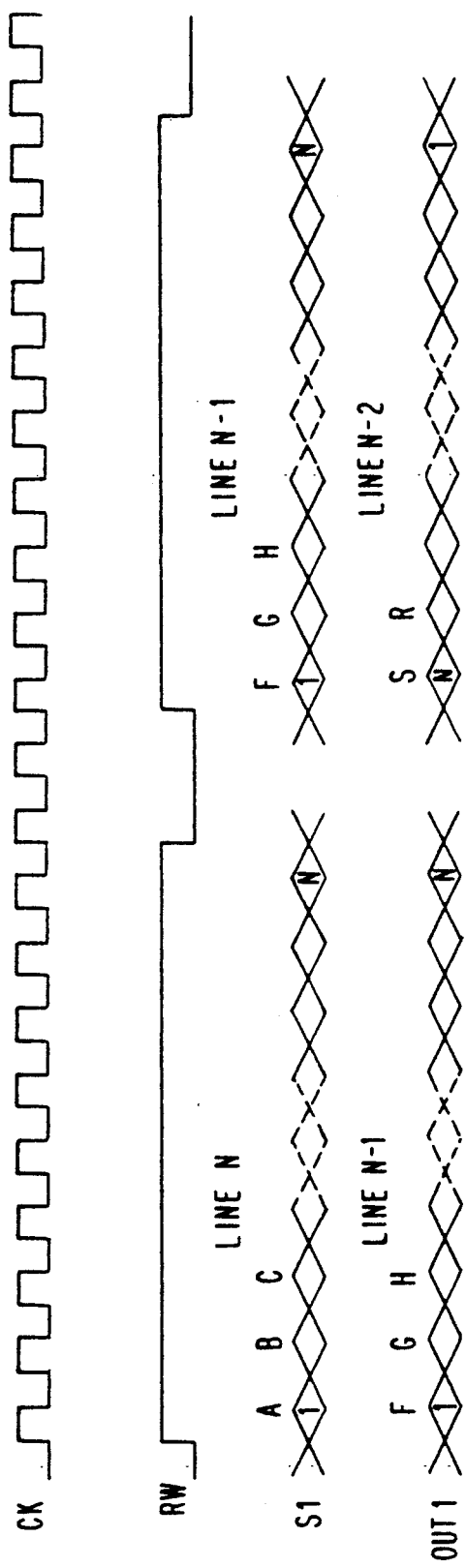

With reference to the drawing views, generally and schematically shown at 1 is a programmable device according to the invention for storing digital video lines 2 as seen in FIG. 2.

The device 1 is particularly useful in TV sets with digital scan of the video frame.

Such digital sets receive on their input a composite synchronization video signal from a receiving serial, and perform an analog-to-digital conversion of that signal by means of a converter.

The device 1 of this invention receives on its input a signal S1 encoded in digital form and corresponding to the line synchronization video signal received by the TV set. The signal S1 is encoded as sequences of so-called bytes, i.e. groups of eight bits, each corresponding to a video sample of the frame, commonly referred to as a pixel.

As shown in FIG. 2, each line 2 of the video frame is encoded as a sequence of n pixels. In addition, the video frame consists of plural overlapping lines 2, of which the current one will be referred to as the nth line hereinafter.

The device 1 comprises a bank of cascade interconnected registers. Specifically, five 8-bit registers T1, T2, T3, T4 and T5 are provided, the first T1 of which receives on its input said digital signal S1.

Each of said registers is adapted to store one pixel of the video line 2, and accordingly, the series of the first four registers T1, T2, T3 and T4 will provide simultaneous access to four pixels, thereby effecting a so-called paralleling of samples of the input signal.

The last register T5 is adapted to store an additional pixel in order to accommodate the delay introduced by the frame line scanning and produce on an output RT, additionally to the pixel of the current nth line, also the pixels of (n−1)th and (n−2)th lines directly preceding it.

The operating frequency of the device 1 is controlled by a clock pulse CK. This pulse CK is applied to a frequency divider CKD effective to set the operating frequency of the various subsystems of the device in a manner that depends on the value of MT.

Each of the registers T1 to T5 is connected to an output of said divider CKD and will operate, therefore, at a frequency tied to the operating mode. Said clock frequency will be one half the frequencies in the third operational instance of speed-up.

Such registers will also receive a reset signal R which is further applied to a control circuit 3 and the frequency divider CKD.

Indicated at L1 and L2 are respective banks of RAM memories (Random Access Memories).

Each memory bank L1, L2 can store one line 2 of the video frame. In a preferred embodiment, each memory has a size of three hundred twenty cells 10 having a word length of thirty two bits each. Said cells 10 are diagramatically shown in FIG. 7 at 1A ... 320A and 1B ... 320B, respectively, for each memory L1 and L2.

Said memories have respective data inputs I1, I2 connected to each output of the first four registers T1, T2, T3 and T4.

In addition, said memories have data outputs U1, U2 connected to corresponding inputs of a two-input multiplexer 4 having two outputs OUT1 and OUT2.

Connected to each of the multiplexer 4 outputs are corresponding sequencer blocks 5 and 6, as required to sequence the pixels issuing in paralleled form from the memories L1 and L2.

Accordingly, said blocks 5 and 6 will receive on their inputs thirty two-bit codes and produce, on their outputs OUT1 and OUT2 sequences of eight-bit words.

Also the multiplexer 4 and the blocks 5 and 6 receive the reset signal R.

Lastly, the control circuit 3 will control the whole device 1, driving the other device components through its outputs.

More specifically, this circuit 3 receives on its input a signal MT containing digital information as to the type of operation that the user wants for the device 1. Fourth different operating modes are provided and encoded which will be described in detail hereinafter. This signal MT is also input to the multiplexer 4 and the blocks 5 and 6.

A second signal RW indicates the end of the write line; this signal is at a logic low as the electronic pencil which line scans the video frame is in its return period.

A third signal RR indicates the end of the read line.

Furthermore, the circuit 3 has respective series of outputs 7, 8 and 9 connected to drive each of the memories L1 and L2 to enable the data readout/write in and address count.

Another output SL is connected to the multiplexer 4 and the blocks 5 and 6 to ensure operational synchronization of the whole device.

The operation of the device 1 according to the invention will be described herein below with reference to an initial state wherein the user has selected an operational mode for the memory known as FIFO (First-in-first-out).

Case I

In this first mode of operation, the device 1 allows simultaneous access of the TV set to the pixels of the current line, the nth line, and to those of the two lines directly preceding it.

With reference to FIG. 2, the references A1, A2 ... An denote the pixels of the nth line, whilst B1, B2 ... Bn and C1, C2 ... Cn respectively denote the values of the pixels of the (n−1)th and (n−2)th lines.

If T denotes the scan period of one video line 2, by making reference to a generic time t, it can be noted in FIG. 2 that the outputs OUT1 and OUT2 of the device 1 reproduce the samples that were input at the time t−T and t−2T.

Figure 7:
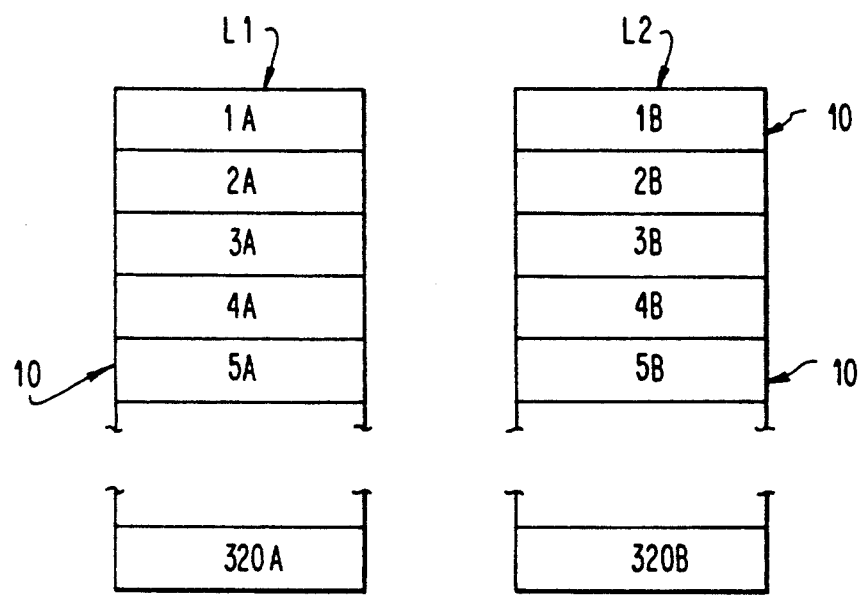
FIG. 7 is a detail diagram of the device shown in FIG. 1.

As an example, and making reference to FIG. 7 which sets out the contents of memories L1 and L2 in diagramatic form, each memory having a single video line capacity, at the generic time t, there will be in the cell 1A the first four pixels B1, B2, B3, B4 of the line preceding the current line, whereas in the cell 1B there will be the first four pixels C1, C2, C3, C4 of the line ahead of the preceding one, i.e. the (n−2)th line.

The input signal S1 will instead contain the code A1, A2 ... of the pixels of the current nth line.

Under such operating condition of the FIFO type, the device 1 will read out and output the contents of the cells 1A and 1B, whilst at the next clock time, it will write the new input value A1, A2, A3, A4 in the cell 1B.

It will be appreciated that the groups of four pixels under consideration represent the data format whereby the memories L1 and L2 are written and read.

In all cases, this first operating mode allows a total of three lines to be handled, as required to process the frame in the so-called vertical domain.

The device 1 proceeds in successive steps to read out the contents of the cells 2A and 2B and write the new value of the second group of four pixels, A5, A6, A7, A8, in the cell 2B, and so forth to the last pixel groups.

Upon a line being scanned to its end, the operation will start again with reading out the cells 1A and 1B which now contain the sequences B1, B2, B3, B4 and A1, A2, A3, A4, respectively. The cell 1A contains the values of the oldest line, and accordingly, the new value X1, X2, X3, X4 of the current (n+1)th line will be written in said cell 1A.

The output RT of the register T5, moreover, provides simultaneously the pixels of the current line as well, which advantageously affords the possibility of accommodating the delays brought about by the RAM and multiplexer 4 updating.

Case II

The device 1 can operate in a second mode of the LIFO (Last-in-first-out) type.

The operating sequence is much like that of Case I, with a major difference from that in this second case, the write-in operations are effected in only one of the two memories, with the other being read out. The readout is effected, however, alternately from the first cell to the last, and conversely, from the last to the first.

This second operating mode may apply, so far still at an experimental stage, to novel methods of scanning the video frame.

In essence, the first four pixels of the current nth line are written in the cell 1A, and simultaneously therewith, the cell B is read out which contains the first four pixels B1, B2, B3, B4 of the preceding line.

Thereafter, the second group of four pixels A5, A6, A7, A8 of the current line is written in the cell 2A, while reading out the cell 2B, and so forth with each group of four line pixels.

It will be appreciated that the contents of the memory L1 had already been read out during the preceding line scan.

As the (n+1)th line becomes the current line, the first four pixels X1, X2, X3, X4 will be written in the cell 1B, and simultaneously therewith, the last cell 320A in the memory L1 is read out. The next second group of four pixels X5, X6, X7, X8 will be written in the cell 2B while the last-but-one cell 319A is read in the memory L1.

Figure 5:
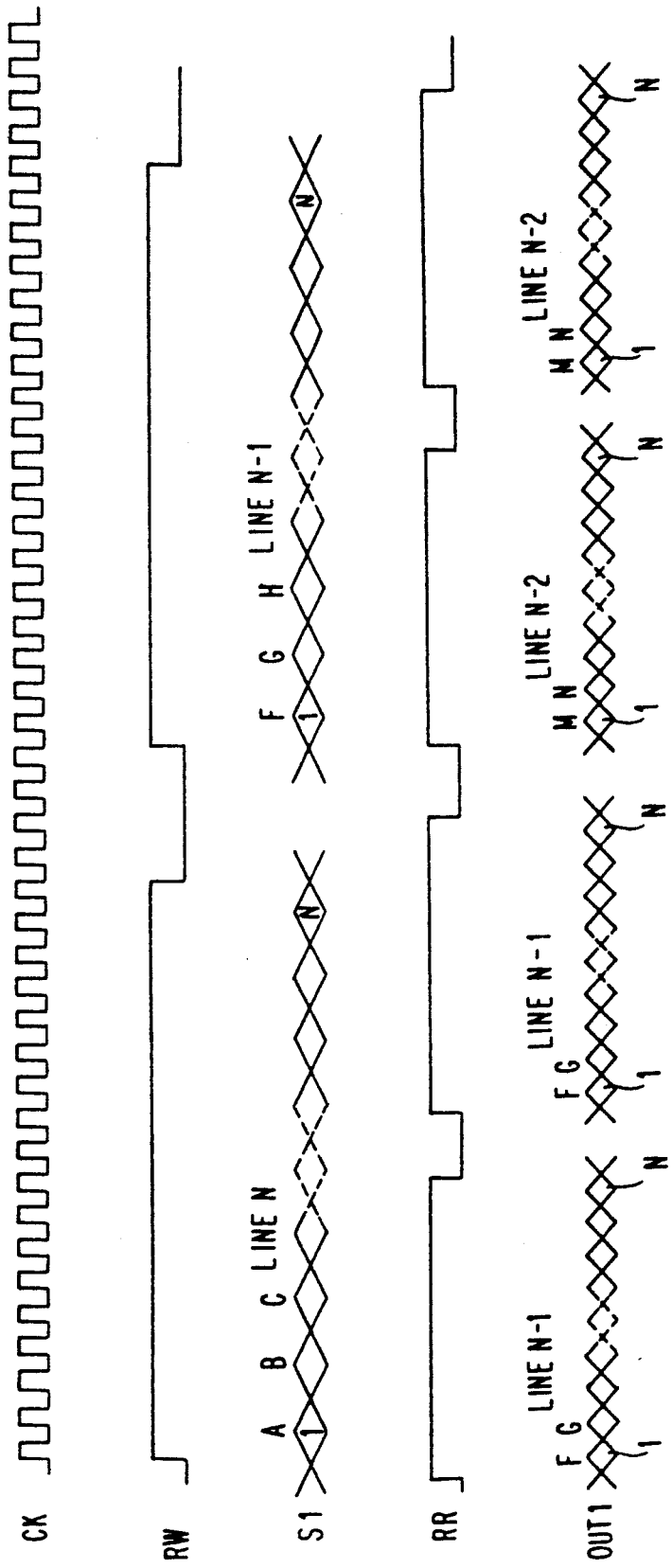

FIG. 5 shows the patterns of the main signals involved in this mode of operation.

Case III

According to the invention, the device 1 is enabled to operate in two other modes, of which the first is termed the "speed-up" mode.

This, the third, operation mode consists of writing in a memory the current nth line and reading out the preceding, (n−1)th line from the other memory.

However, the readout is carried out here at twice the frequency of the write step; in this way, while writing in one of the two memories, the other memory can be read twice.

Figure 6:
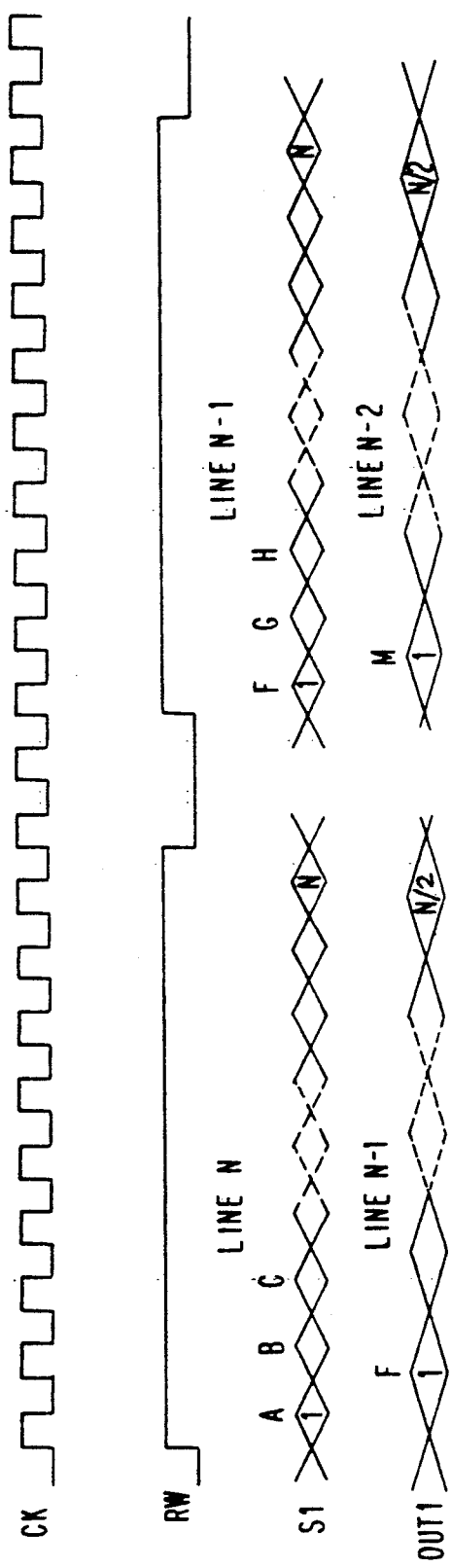

The patterns of the main signals when operating in the speed-up mode are shown in FIG. 6.

Case IV

A further operation mode, commonly referred to as the "speed-down" mode, is similar to, but the opposite from the former case.

In this case, the readout operation is performed at a frequency which is frequency half the write one. This means that only a half video line will be read at all times, thereby said half line is extended to substantially occupy the entire video line.

The two last-named speed-up and speed-down functions find their application, within new generation digital TV sets, to the the implementation of the so-called special effects (picture within the picture and magnification).

It may be appreciated from the foregoing description that the greatest advantage afforded by the inventive device resides in its paralleling the series of pixels input to the memories, thereby achieving in essence a relaxation of the access times to the memories.

This device can store no less than two digitalized video lines, in conformity with current TV standards, while it can handle data relating to four different modes of operation to be selected by the user as needed.

Another major advantage of the invention is that said four different functions are provided by means of a single integrated electronic component.

We claim:

1. A programmable device for storing digital video lines, the device being of a type intended for use in digital frame scan TV sets wherein a video line is sample encoded in a digital signal to provide code samples, comprising at least one pair of memories, each adapted to contain code corresponding to one video line, a bank of registers connected in series with one another and also connected to each of said memories, at least one of said registers receiving on its input said digital signal for paralleling said samples for application to said memories, a control circuit having outputs connected to each of said memories for selecting different operation modes for storing said code samples, and an additional register connected downstream from said bank of registers and having an output at which the code of a video line sample preceding the video line which is going to be stored is output.

2. A device according to claim 1, in which said memories have respective data inputs connected to each output of said bank of registers.

3. A device according to claim 1, which includes a multiplexer having inputs connected to corresponding outputs of said memories and having outputs at which the codes of video lines preceding the video line in process to be stored, are presented.

4. A device according to claim 3, in which sequencer blocks for sequencing samples output by the memories in parallel form are connected to each of the respective multiplexer outputs.

5. A device according to claim 1, provided as a single integrated circuit.

* * * * *